United States Patent [19]
Ganne et al.

[11] Patent Number: 5,557,090
[45] Date of Patent: Sep. 17, 1996

[54] CARD HAVING A FERROMAGNETIC TRACK AND READER THEREFOR

[75] Inventors: Jean-Pierre Ganne, Orsay; Michèle Labeyrie, Fontenay aux Roses; Jean-Claude Dubois, Saint-Remy les Chevreuse, all of France

[73] Assignee: THOMSON-CSF, Paris, France

[21] Appl. No.: 401,251

[22] Filed: Mar. 9, 1995

[30] Foreign Application Priority Data

Mar. 11, 1994 [FR] France ................................. 94 02861

[51] Int. Cl.$^6$ ......................................................... G06K 7/08
[52] U.S. Cl. ........................... 235/449; 235/450; 235/493; 235/435; 283/72; 283/82; 283/85
[58] Field of Search ..................................... 235/449, 450, 235/493, 435; 283/72, 82, 83, 85, 87

[56] References Cited

U.S. PATENT DOCUMENTS

| | | | |
|---|---|---|---|
| 3,509,535 | 4/1990 | Berube | 235/449 X |
| 3,611,197 | 10/1971 | Moore et al. | 333/1.1 |
| 4,350,883 | 9/1982 | Lagarde | 235/435 |
| 5,143,636 | 9/1992 | Gaucher et al. | 252/62.9 |
| 5,241,163 | 8/1993 | Vachtsevanos et al. | 235/449 |
| 5,313,193 | 5/1994 | Dubois et al. | 340/572 |

FOREIGN PATENT DOCUMENTS

| | | |
|---|---|---|
| 0022390 | 1/1981 | European Pat. Off. . |
| 4103832 | 8/1992 | Germany . |
| 298498 | 4/1990 | Japan . |
| 8301642 | 5/1983 | WIPO . |

OTHER PUBLICATIONS

Hewlett–Packard Journal, vol. 41, No. 5, Oct. 1990, Palo Alto, CA. Nicholson, D. B. "Hexagonal Ferrites For Millimeter–Wave Applications".

*Primary Examiner*—Donald T. Hajec
*Assistant Examiner*—Michael G. Lee
*Attorney, Agent, or Firm*—Oblon, Spivak, McClelland, Maier, & Neustadt, P.C.

[57] ABSTRACT

A bank or identity type of magnetic card contains ferromagnetic elements that selectively absorb waves at microwave frequencies. The disclosure also relates to a reading device adapted to this card. The device has an active system and a resonant system capable of filtering the microwaves at the resonance frequencies of the ferromagnetic materials of the card to be read. The reading device, equipped with a system to measure the amplitude of the microwaves, can thus recognize the magnetic information elements on the card, through the disturbance or non-disturbance of the microwaves during the insertion of the card into the device. The value of the encoding of the card lies in fact that the information elements are hard to destroy.

11 Claims, 9 Drawing Sheets

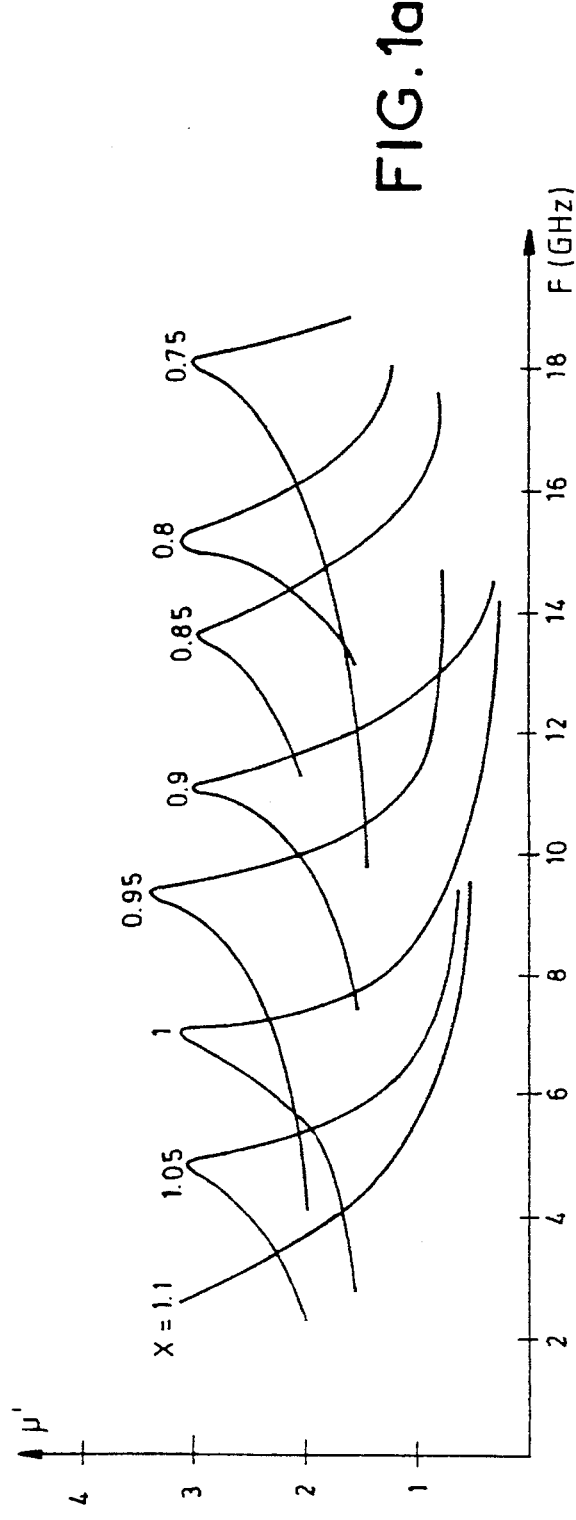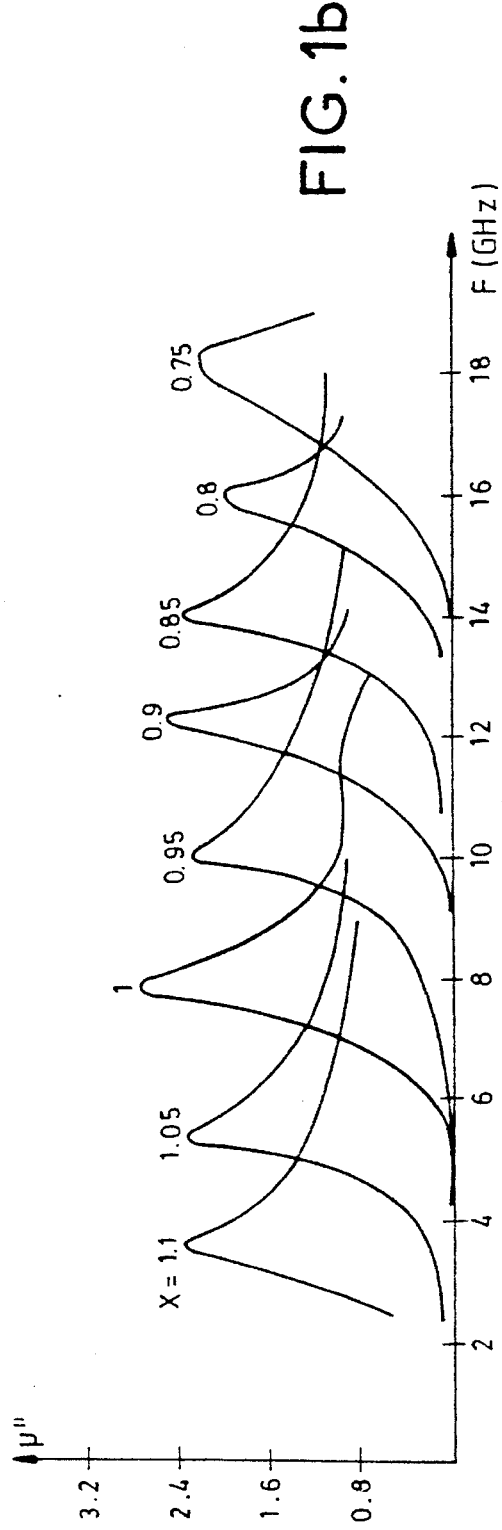
FIG.1a
FIG.1b

TRANSMITTED POWER 5.1  F (GHz)

CARD HAVING A FERROMAGNETIC TRACK AND READER THEREFOR

BACKGROUND OF THE INVENTION

1. Field of the Invention

The field of the invention is that of personal cards such as identity cards, bank cards, etc.

More specifically, the invention relates to a card with magnetic marking, containing elements that selectively absorb microwave frequencies, and the reading device that matches this type of card.

2. Description of the Prior Art

At present, the problem of the identification of a personal card may be resolved in different ways.

It is thus possible to use a sign of recognition related to the bearer of the card that is relatively simple to identify. This sign could notably be an identity photograph, a fingerprint, etc. However, this method has two major drawbacks: it is easy to disguise or modify this card whereas it is difficult to recognize the distinctive signs (photograph or fingerprint) electronically in order to process them, for example to compare them with a data base.

It is also possible to use an identification code, such as a bar code, a magnetic code or a code on a chip card such as for a bank credit card. The solution using the chip card proves to be relatively costly while the other approaches are relatively easy to misuse. Thus, the magnetic cards used at present result from the recording of magnetic domains oriented in one direction or the other. In the presence of a magnetic field, such information elements can easily be destroyed, leading to the elimination of the mode of authentication of the personal card.

SUMMARY OF THE INVENTION

In this context, the present invention proposes a novel magnetic card whose information and coding becomes hard to destroy. The coding system is a novel one that is harder to counterfeit than those of the prior art and remains inexpensive to perform both for the card coding part and for the reading system associated with this type of card.

This encoding of information elements is done on the card by the presence of a track on which there are arranged ferromagnetic elements that resonate spontaneously at different frequencies in microwave mode and hence absorb the microwaves in a certain band centered on their resonance frequency. The reading of such a card is done by a device capable of sending out microwaves, at frequencies identical to those of the resonance of the ferromagnetic materials used in the magnetic card, and of measuring the amplitude of the microwaves that are disturbed or not disturbed by the insertion of the card into said device.

More specifically, the magnetic card according to the invention comprises a track on which elements are positioned, each comprising a ferromagnetic material $M_i$ resonating at a microwave frequency $fo_i$ and therefore absorbing the microwaves in a band $B_i$ centered on the resonance frequency $fo_i$.

Typically, the magnetic elements may be made out of composite material containing ferromagnetic powder. It is easy to implement industrial-scale applications of such composite materials. And, while the magnetic spectrum of the composite material is broader than that of the crude magnetic material, its range of resonance frequency remains unchanged with respect to that of the crude material.

The magnetic charges used in a card according to the invention may advantageously be of the hexagonal or spinel ferrite type. In this family of ferromagnetic material, the resonance frequency may be selected by the chemical composition.

The magnetic card according to the invention can be made out of any plastic type of flexible or hard substrate on which there is made the magnetic track taking the form of the alignment of pellets of composite materials charged with ferromagnetic $M_i$.

An object of the invention is also a reading device associated with the type of card according to the invention. More specifically, it is a card reading device to read magnetic cards comprising microwave-absorbent elements, wherein said device comprises at least one cavity with a slot enabling the introduction of the part of the card possessing the absorbent elements, said cavity being capable of confining the microwaves and comprising an active system capable of generating microwaves, a resonant system capable of filtering one or more waves at a precise frequency and a system for measuring the amplitude of the disturbed or undisturbed microwaves by the introduction of the magnetic card.

The resonant system provides for the selection of microwaves at determined frequencies, established by the configuration of the resonant system itself. This configuration may advantageously comprise a dielectric resonator inserted between conductive elements, the unit constituting an oscillator. The active element and the measurement system may advantageously be diodes.

In another variant of the system, an oscillator may constitute the unit formed by the active system and the resonating system.

Thus, the card-reading device according to the invention may comprise several oscillators, each oscillator being enclosed in a cavity having a slot, thus enabling the insertion and passing of the magnetic track. The response of each oscillator, subjected to the transmission of microwaves by an active element, may be detected by a diode appropriately located in the cavity. And when the magnetic track of the card is made to pass in the slot of the reading device, appropriately positioned with respect to the resonant structure of the oscillator, the response of a given oscillator is not disturbed and therefore the voltage level delivered by the corresponding diode is the maximum, so long as the frequency band of the magnetic material $M_i$ facing the cavity does not include the frequency of the oscillator located in this cavity.

On the contrary, when the frequency of the oscillator falls within the frequency band of the magnetic material $M_i$ considered, and thus disturbs the cavity considered, the signal given by the oscillator is absorbed by said material $M_i$ and the voltage level delivered by the corresponding diode collapses.

The reading device according to the invention may also be capable of decoding different sorts of cards provided that it has resonators adapted to all the combinations of ferrites of said cards. This is why an object of the invention is also a device for the reading of a magnetic card comprising n elements $E_i$ comprising a ferromagnetic material absorbing the microwaves in a frequency band $B_i$, wherein it comprises m cavities capable of confining the microwaves, each cavity comprising an active element sending out microwaves, a system $R_j$ capable of filtering at least one electromagnetic wave frequency $f_j$, $f_j$ belonging to a frequency band $B_i$, a system to measure the amplitude of the microwaves, a slot so as to enable the insertion and passing of the magnetic card in all the m cavities, the number m being greater than or equal to the number n.

BRIEF DESCRIPTION OF THE DRAWINGS

The invention shall understood more clearly and other advantages shall appear from the following description, given by way of a non-restricted example and from the appended figures, of which:

FIGS. 1A and 1B illustrate the spectra of magnetic permeability μ of an example of material $M_i$ of the $BaCo_xTi_xFe_{12-2x}O_{19}$, as a function of the frequency;

* FIG. 1a pertains to the progress of the real part μ' of permeability as a function of frequency, for different rates of substitution x,

* FIG. 1b pertains to the progress of the imaginary part μ" (representing magnetic losses) of permeability as a function of the frequency, for different rates of substitution x;

* FIG. 2a relates to solid ferrite,

* FIG. 2b relates to an exemplary composite material charged with 40% by volume of the above solid ferrite;

Figure 15:
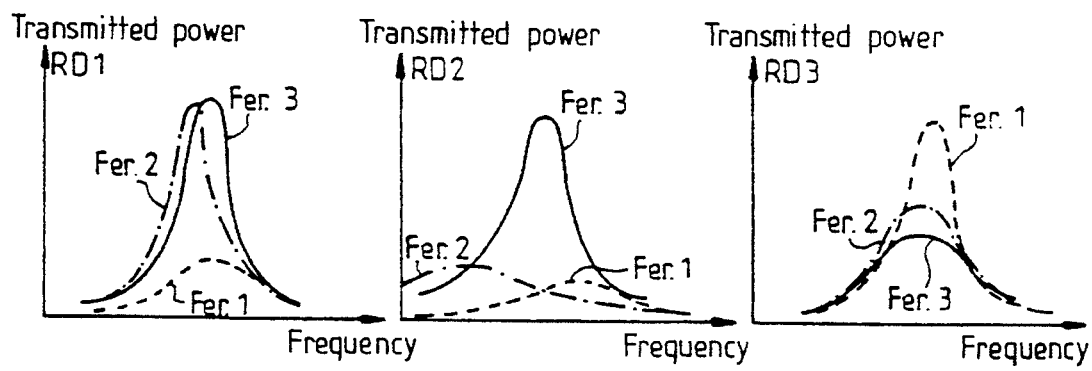
Figure 17:
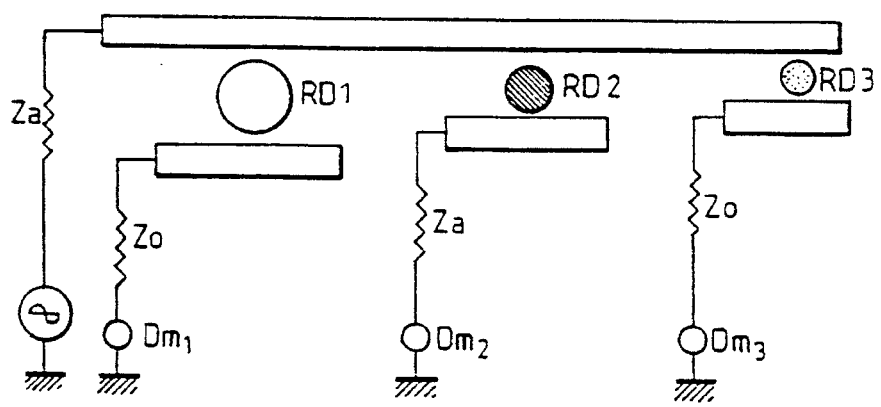
Figure 16:
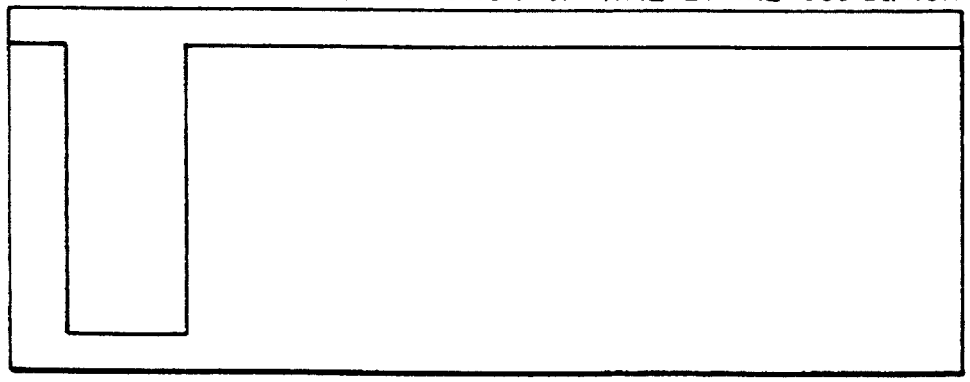
Figure 16:
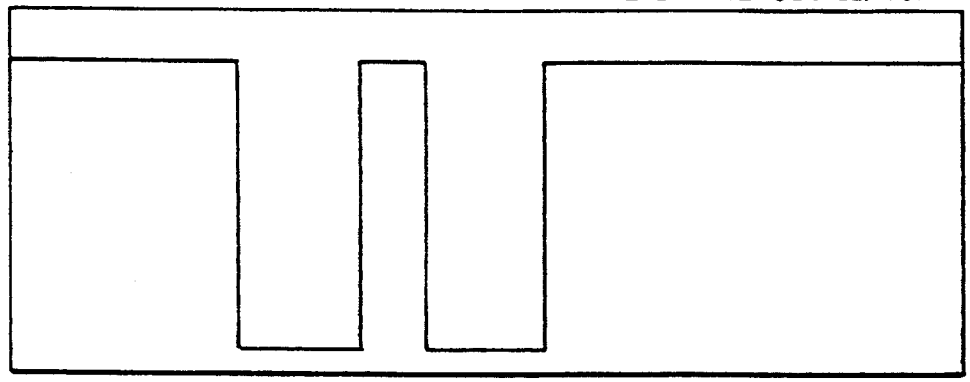
Figure 16:
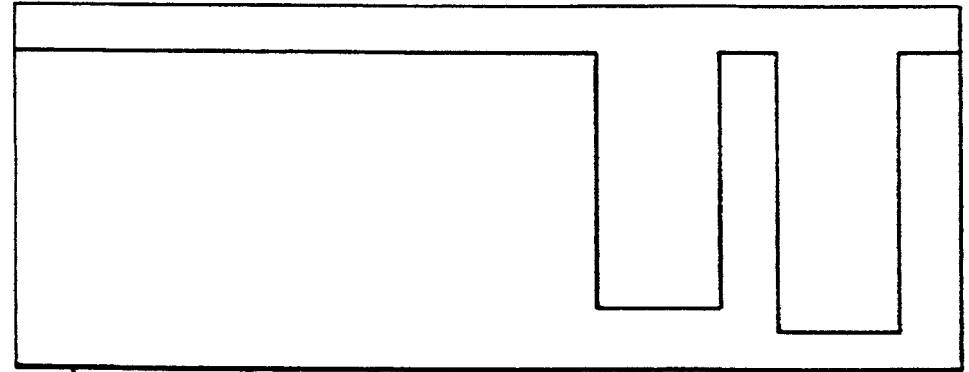
Figure 16:
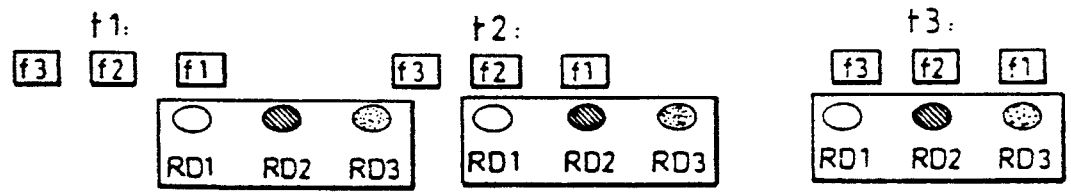

* The left hand graph gives the progress of the real part of the magnetic permeability μ' as a function of the frequency,

* The right hand graph gives the progress of the imaginary part of the magnetic permeability μ" as a function of the frequency;

FIG. 15 illustrates the values of luminous power transmitted by three resonators during the passing of three ferrites as a function of frequency, the three resonators being contained in three cavities Cav 1, Cav 2 and Cav 3;

FIG. 16 illustrates the signal detected as a function of time by three diodes located respectively in the three cavities Cav 1, Cav 2 and Cav 3;

FIG. 17 gives a schematic view of another exemplary configuration of a reading device according to the invention having only one cavity.

MORE DETAILED DESCRIPTION

The magnetic card according to the invention has a track on which there are placed elements comprising ferromagnetic materials. The materials may be hexagonal ferrites whose spontaneous resonance frequency can be adjusted as a function of the chemical composition. Thus, with M type ferrites according to the formula $BaFe_{12}O_{19}$ it is possible to make materials resonating between 2 and 47 GHz approximately depending on their rate of simultaneous substitution of Co-Ti or of Mn-Ti or again of Zn-Ti (M. PATE, J. C. MAGE, J. P. GANNE, *Journées Nationales Microondes*, Nice, 1987, p. 329). Similarly, in cobalt-substituted spinel type ferrites, it is possible to make materials resonating between some tens of megahertz and several gigahertz (M. LABEYRIE, R. LEBOURGEOIS, M. PATE, International Conference on Ferrites 6, Tokyo, 1992). FIG. 1 illustrates this point and shows that it is possible to adjust the resonance frequency of a $BaCo_xTi_xFe_{12-2x}O_{19}$ as a function of the rate of substitution x. Thus, by depositing a series of elements comprising ferrites of variable composition, it becomes possible to prepare a card-encoding system, according to the invention, that can be decrypted by an appropriate reading device.

Figure 2A:
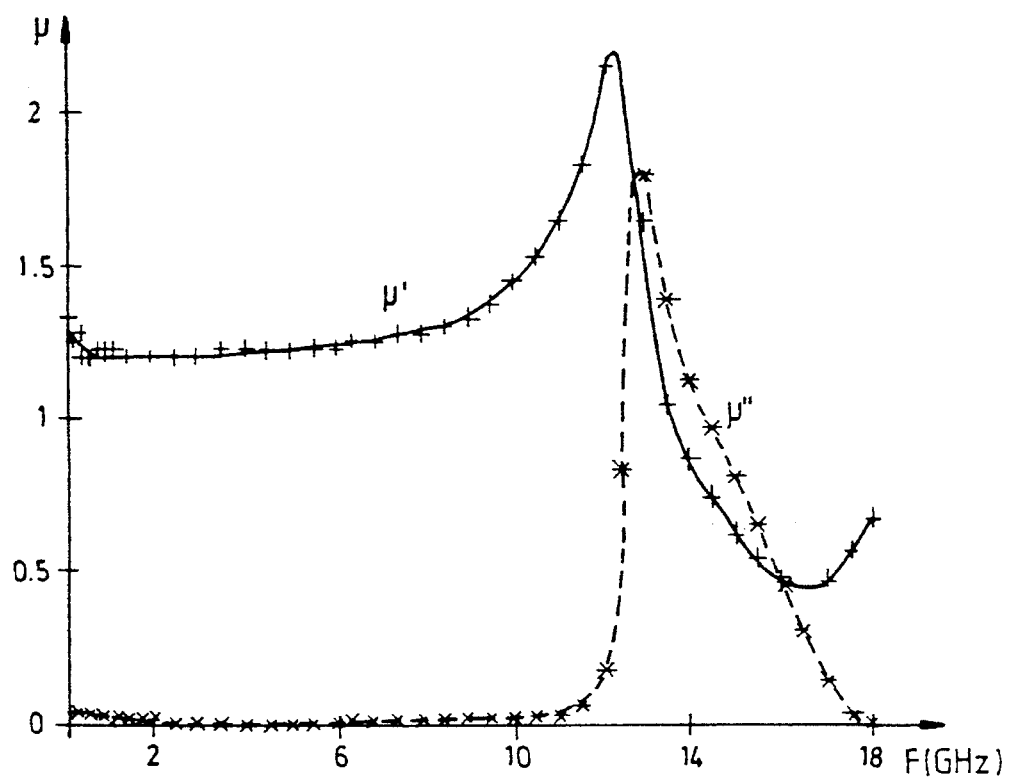
FIGS. 2A and 2B illustrate the progress of the values of permeability μ' and μ" as a function of the frequency for the ferrite $BaFe_{8.8}Zn_{1.6}Ti_{1.6}O_{19}$ as a function of the frequency.
Figure 2B:
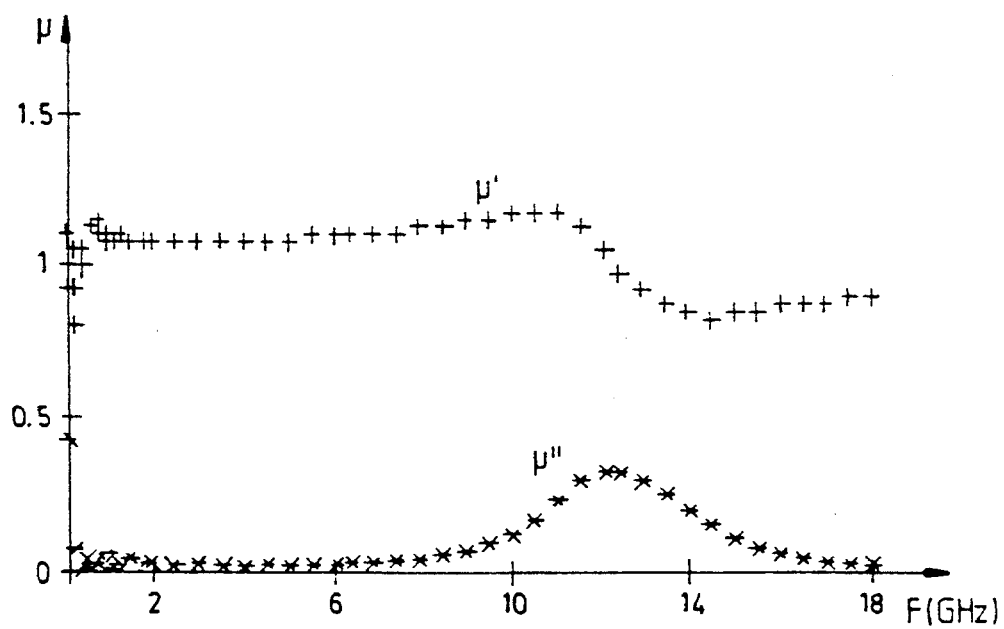

To make a magnetic card according to the invention, it is advantageously possible to resort to standard techniques of the deposition of paint or silk-screen compound by using composite materials charged with ferrite powder. FIG. 2 shows the progress of the permeability of a compound $BaFe_{8.8}Zn_{1.6}Ti_{1.6}O_{19}$ as a function of the frequency. FIG. 2a relates to crude ferrite while FIG. 2b relates to a composite charged with 40% by volume of $BaFe_{8.8}Zn_{1.6}Ti_{1.6}O_{19}$. The fact of using a ferrite-charged composite material does not lead to a change in the range of resonance frequency as can be seen by the comparison of FIGS. 2a and 2b. Only a broadening of said bands is observed. This is why the making of the magnetic cards according to the invention can advantageously be done with composite materials.

Figure 3:
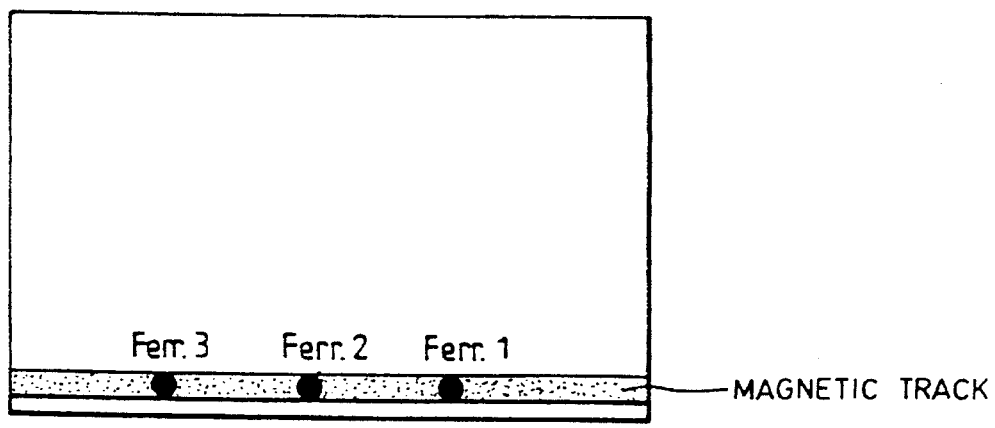
FIG. 3 exemplifies a exemplary magnetic card according to the invention comprising a track designed for the reading of the card, said track comprising three elements based on ferromagnetic material.

FIG. 3 shows an example of a magnetic card according to the invention. It is a standard card whose only difference lies in the insertion of a magnetic track comprising, for example, a series of three elements of composite materials $M_1$, $M_2$, $M_3$ respectively charged with ferrite 1, ferrite 2 and ferrite 3. More specifically, this card has been made:

with a first ferrite of the $BaCo_xTi_xFe_{12-2x}O_{19}$ type and x=1.2.

with a second ferrite of the $BaCo_xTi_xFe_{12-2x}O_{19}$ type and x=0.95.

with a third ferrite of the $BaZn_xTi_xFe_{12-2x}O_{19}$ type and x=1.6.

The elements are made with 50% charged composite materials. Pellets with a diameter of 4 mm and a thickness of 0.5 mm, with a spacing of about 2 cm, form the track, the unit being made on a standard plasticized card substrate.

Figure 4:
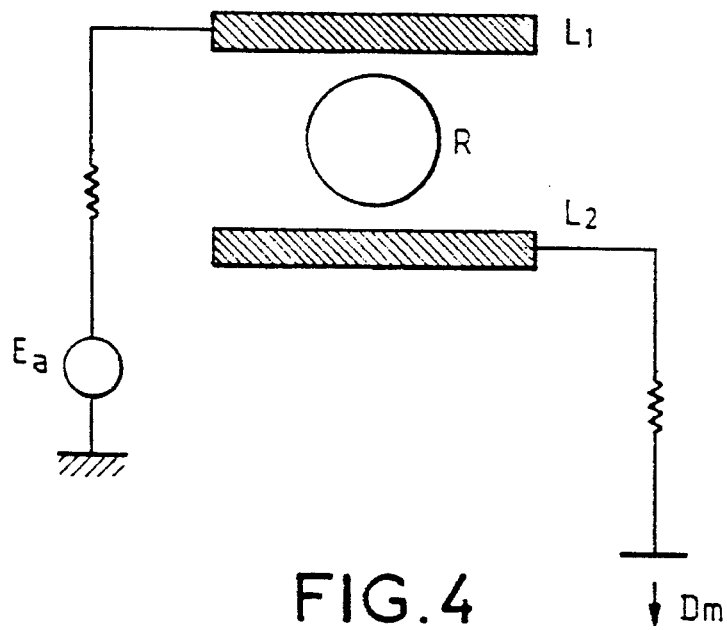
FIG. 4 exemplifies an oscillator according to the invention.
Figure 5:
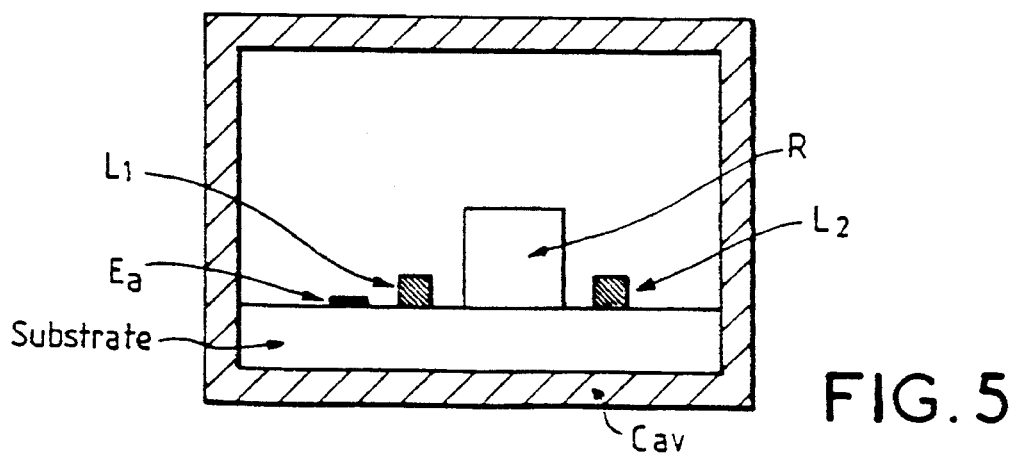
FIG. 5 exemplifies a metallic cavity, used in the magnetic card reading device according to the invention.

The reading device for this type of card proposed in the invention may preferably be formed by a set of oscillators with dielectric resonators at different frequencies which will be selectively disturbed or not disturbed by the magnetic materials of the track of the card. The oscillators that could equip the reading device according to the invention are illustrated by FIG. 4. The oscillator has two conductive lines $L_1$ and $L_2$ called microstrip lines, $L_1$ being connected to the active microwave transmitter element and $L_2$ being connected to a reading device, a diode for example. The lines $L_1$ and $L_2$ convey the microwaves. It may also comprise a dielectric resonator R inserted between the lines $L_1$ and $L_2$. This resonator, by its dimensions and electrical permittivity $\epsilon$, leads to the selection of a frequency fo that is stable, this frequency $f_o$ being chosen in the range of absorption frequencies of a ferromagnetic material M of the magnetic card. The unit formed by the active element, the resonant system and the reading system is inserted into a metal cavity type of cavity capable of confining the microwaves as illustrated in FIG. 5.

Figure 6:
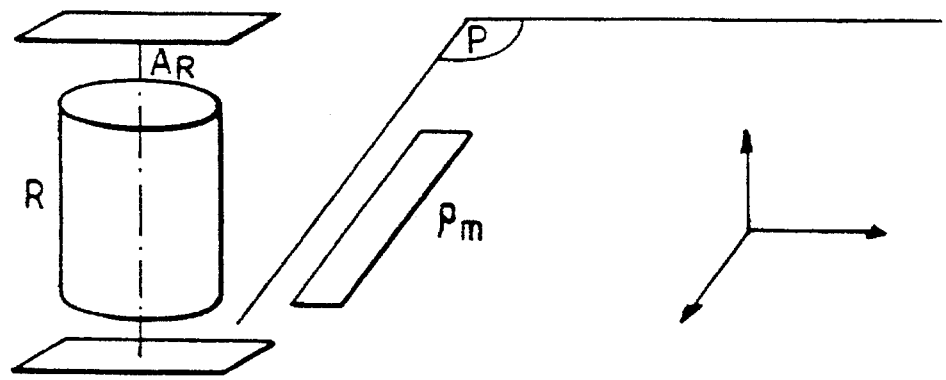
FIG. 6 exemplifies a resonator in the reading device and the interaction between this resonator and the magnetic card comprising ferromagnetic elements.

The dimensions of the cavity, the natural frequency of the resonator as well as the coupling between the resonator and the conductive line establish the conditions for the resonance frequency of the oscillator according to an natural mode. Now, to observe or not observe the disturbance in this cavity by the presence of a ferromagnetic element of the track, it is necessary to choose a mode for which there is a plane in which electrical field E is negligible before magnetic field H. To this end, the cylindrical $TE_{011}$ mode of the cylindrical resonator is appropriate. Thus the disturbance due to the presence of the ferromagnetic material in the vicinity of the resonator is solely magnetic. By positioning the magnetic track in a plane perpendicular to the axis of the resonator as illustrated in FIG. 6, there is actually a disturbance of a magnetic kind capable of being detected by a system for measuring the amplitude of the microwaves.

Figure 7:
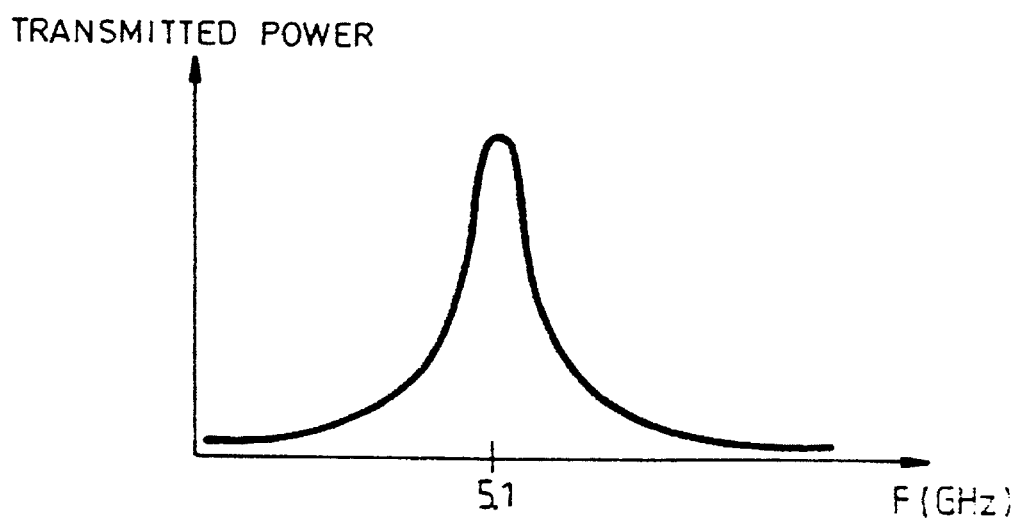
FIG. 7 illustrates the power transmitted for an exemplary cylindrical resonator $R_1$ as a function of the frequency.
Figure 8:
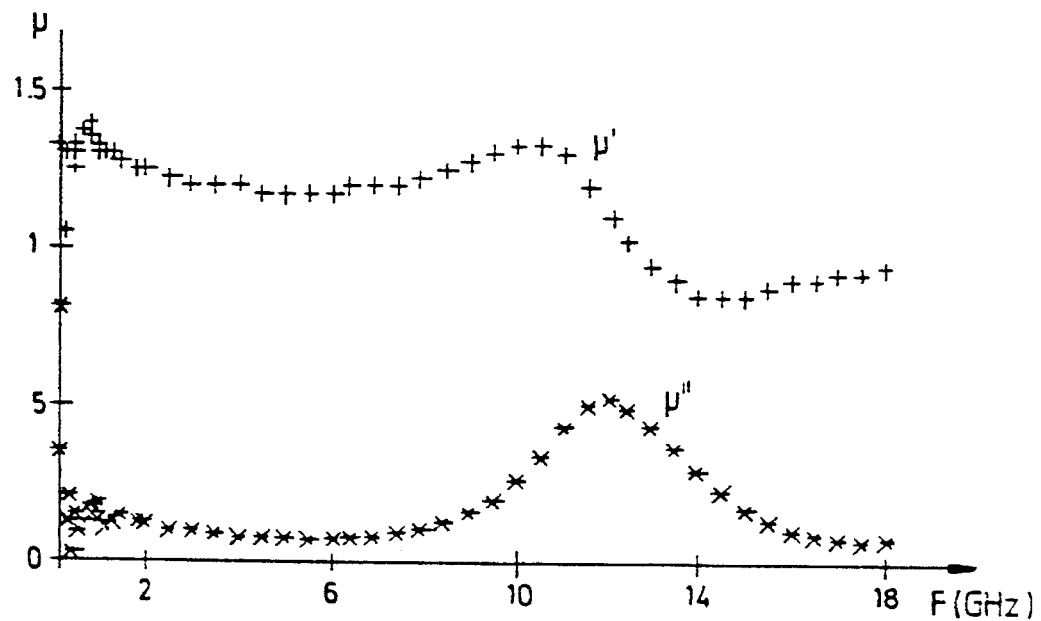
FIG. 8 illustrates the magnetic spectrum of a ferrite $M_1$ used in an exemplary magnetic track of a card to be read.
Figure 9:
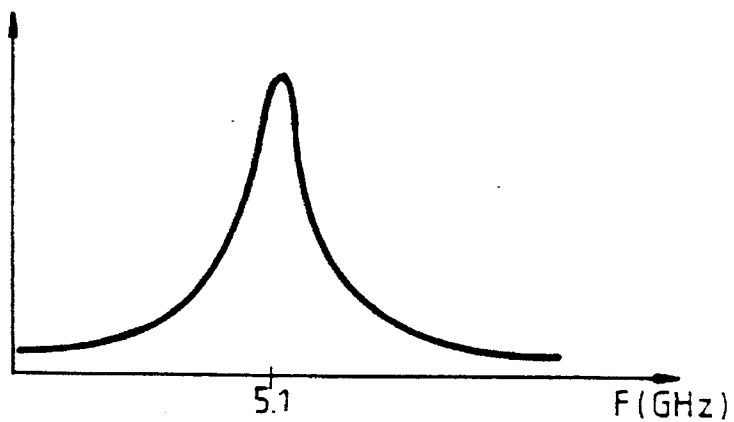
FIG. 9 illustrates the power transmitted by the resonator $R_1$ when the card equipped with the ferrite $M_1$ is inserted into the cavity comprising the resonator $R_1$.

To illustrate the mode of operation of the device for reading the magnetic card according to the invention, a first cylindrical resonator $R_1$ whose transmitted power is illustrated in FIG. 7 has been placed close to a magnetic track comprising a composite material charged with a ferrite $M_1$ whose magnetic characteristics are illustrated in FIG. 8. FIG. 9 shows that no disturbance is then recorded in the power by the resonator $R_1$.

Figure 10:
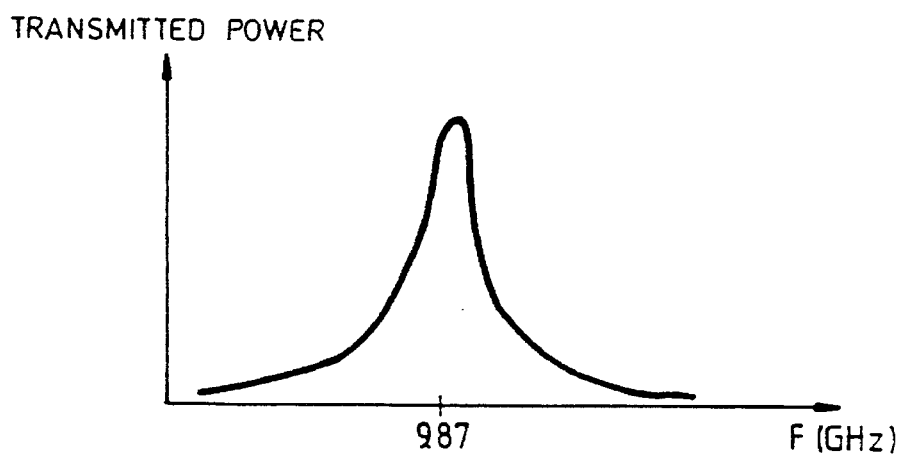
FIG. 10 illustrates the power transmitted by a cylindrical resonator $R_2$ as a function of the frequency.
Figure 11:
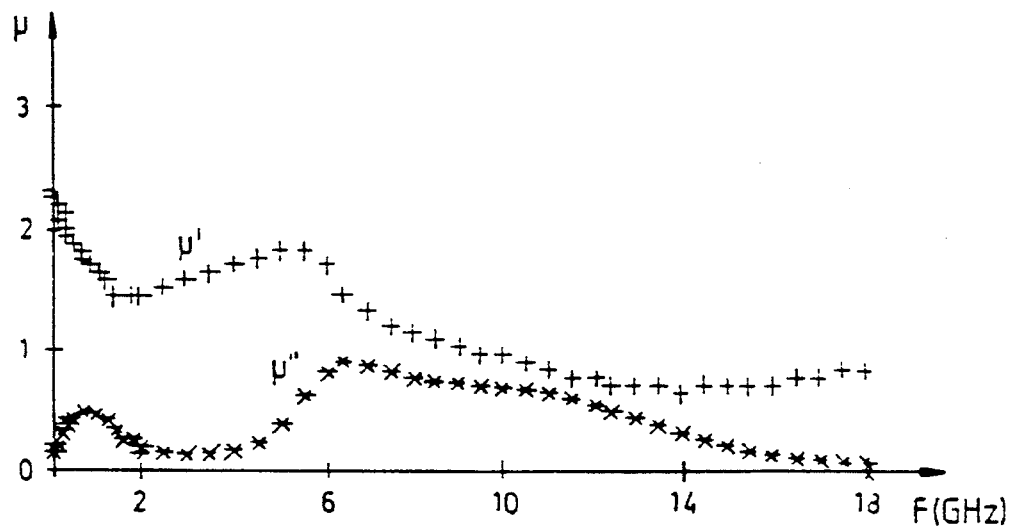
FIG. 11 illustrates the magnetic spectrum of a ferrite $M_2$ used in an example of a magnetic track of the card to be read, having an absorption band containing the resonance band of the resonator $R_2$ referred to in FIG. 10.
Figure 12:
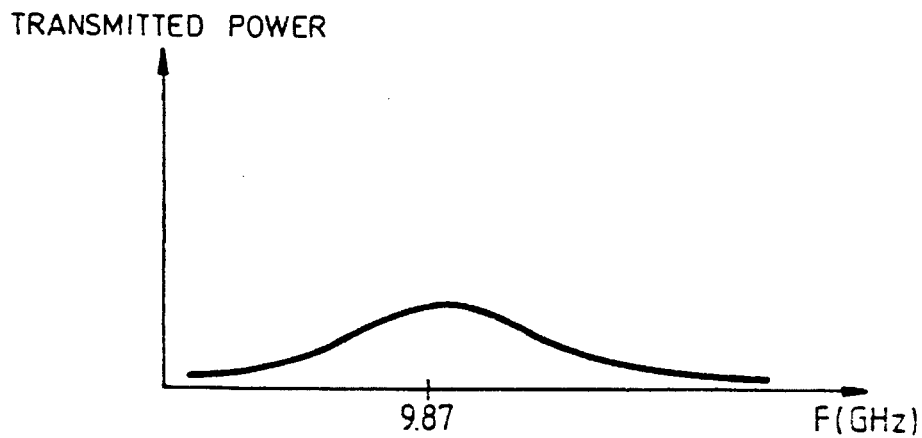
FIG. 12 illustrates the power transmitted by the resonator $R_2$ when the card equipped with the ferrite $M_2$ is inserted into the cavity comprising the resonator $R_2$.

By using, on the contrary, a cylindrical resonator $R_2$ whose transmitted power is illustrated in FIG. 10 to read a magnetic track comprising a composite material charged with a ferrite $M_2$ whose magnetic characteristics are illustrated in FIG. 11, a very marked disturbance is obtained in the power transmitted by $R_2$ when the card is inserted into a cavity containing $R_2$, as shown in FIG. 12.

This operation makes it possible to equip the reading device with several oscillators resonating at different frequencies with slots for the insertion of the magnetic track into each cavity, positioned along a straight line located in one and the same electrical plane for each resonator. This leads to the passing of the magnetic track provided with several elements each comprising a different ferrite. Thus, a simple microwave reading device is obtained for the reading of the microwave magnetic track. It suffices then to pass the microwave magnetic track along the slot to read a code resulting from the combination of different ferrites, by successive disturbance of the oscillators.

Figure 13:
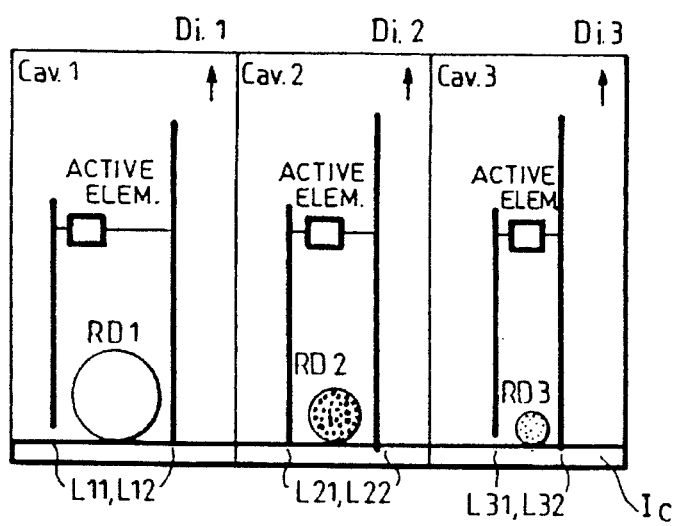
FIG. 13 exemplifies a reading device according to the invention using a set of three cavities provided with dielectric resonators.

Thus, FIG. 13 illustrates an exemplary reading device according to the invention equipped with three cavities Cav 1, Cav 2, Cav 3, each being provided with an active element $E_1$ or $E_2$ or $E_3$ of conductive lines $L_{11}$, $L_{12}$ or $L_{21}$, $L_{22}$ or $L_{31}$, $L_{32}$, a dielectric resonator $RD_1$ or $RD^2$ or $RD_3$ and a reading diode $Di_1$ or $Di_2$ or $Di_3$, the unit having a slot to insert the card $I_c$ in a plane perpendicular to the conductive lines so as to enable the passing of the different ferrites contained in the magnetic track before each resonator successively.

Figure 14:
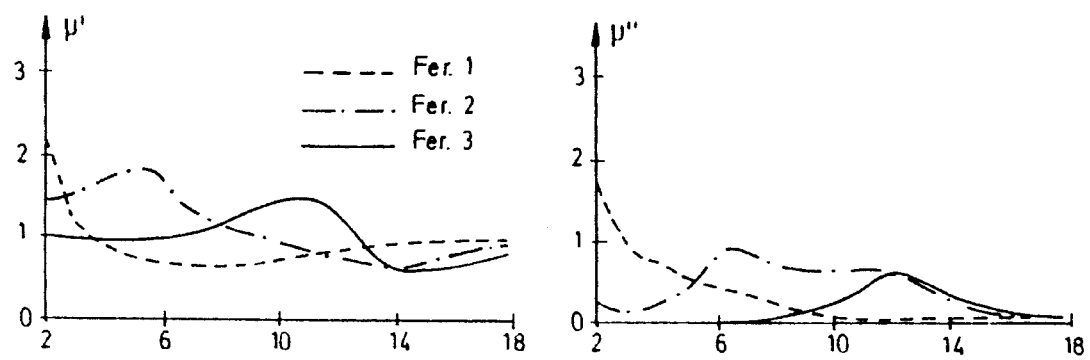
FIG. 14 illustrates the magnetic properties of three ferrites with which a magnetic card according to the invention is equipped.

An exemplary embodiment of the reading device according to the invention shall now be described in the case of the reading of a card equipped with three different ferrites whose magnetic properties are illustrated in FIG. 14, these ferrites having the same composition as those defined in the exemplary magnetic card referred to above ($M_1$, $M_2$ and $M_3$).

The reading device has three resonators $RD_1$, $RD_2$, $RD_3$ whose characteristics are as follows:

| (GHz) | diameter (mm) | thickness (mm) | $\epsilon$ | $fo_i$ |
|---|---|---|---|---|
| $RD_1$ | 10 | 5 | 80 | 3.4 |
| $RD_2$ | 10.7 | 11.7 | 30 | 5.1 |
| $RD_3$ | 5 | 11.6 | 30 | 12.76 |

The first cylindrical resonator is made of $(BaSm)TiO_3$ and the other two are perovskite materials $BaZn_{1/3}Ta_{2/3}O_3$.

FIG. 15 illustrates the values of power transmitted by the three resonators (FIG. 15a for $RD_1$), (FIG. 15 for $RD_2$), (FIG. 15c for $RD_3$) during the passing of the three elements based respectively on $M_1$, $M_2$ and $M_3$ as a function of the frequency.

FIG. 16 for its part illustrates the signal detected as a function of time for each cavity Cav 1, Cav 2, Cav 3 and by the diodes $D_{11}$, $D_{12}$, $D_{13}$.

This figure shows the possibility of reading the encoding of information elements of a magnetic card t5 comprising elements that selectively absorb the microwaves, by a reading device comprising a set of resonators supplied by an active element.

FIG. 17 on this basis illustrates another possible configuration in which the reading device is fitted out with a cavity comprising a single line $L'_1$ connected to a single active element and three lines $L'_{231}$, $L'_{22}$, $L'_{23}$, each connected to a measurement diode $Dm_1$, $Dm_2$, $Dm_3$, the slot for the insertion of the card then being in the plane containing all of said lines.

What is claimed is:

1. A magnetic card comprising a track on which elements are positioned, each comprising a ferromagnetic material $M_i$ resonating at a microwave frequency $fo_i$ and therefore absorbing the microwaves in a band $B_i$ centered on the resonance frequency $fo_i$.

2. A magnetic card according to claim 1, wherein the elements of the track are made out of composite material containing the ferromagnetic materials $M_i$.

3. A magnetic card according to one of the claims 1 or 2, wherein the ferromagnetic materials are hexagonal ferrites.

4. A magnetic card according to one of the claims 1 or 2, wherein the ferromagnetic materials are spinel ferrites.

5. A magnetic card according to claims 1 or 2, wherein the track is strip of plastic material on which the pellets comprising the materials $M_i$ are aligned.

6. A magnetic card reading device to read magnetic cards comprising microwave-absorbent elements, wherein said device comprises at least one cavity with a slot enabling the introduction of the part of the card possessing the absorbent elements, said cavity being capable of confining the microwaves and comprising an active system capable of generating microwaves, a resonant system capable of filtering one or more waves at a precise frequency and a system for measuring the amplitude of the disturbed or undisturbed microwaves by the introduction of the magnetic card.

7. A magnetic card reading device according to claim 6, wherein the resonant system is inserted between two conductive elements, the first one being connected to the active system and the second one being connected to the system for measuring the amplitude of the microwaves.

8. A magnetic card reading device according to one of the claims 6 or 7, wherein the active element is a diode.

9. A magnetic card reading device according to claim 6, wherein an oscillator constitutes the unit formed by the active system and the resonating system.

10. A magnetic card reading device according to claims 6 or 7, wherein the system to measure the amplitude of the microwaves is a diode.

11. A magnetic card reading device for the reading of a magnetic card comprising n elements $E_i$ comprising a ferromagnetic material $M_i$ absorbing the microwaves in a frequency band $B_i$, wherein it comprises m cavities capable of confining the microwaves, each cavity comprising an active element sending out microwaves, a system $R_j$ capable of filtering an electromagnetic wave frequency $f_j$, $f_j$ belonging to at least one frequency band $B_i$, a system to measure the amplitude of the microwaves, a slot so as to enable the insertion and passing of the magnetic card in all the m cavities, the number m being greater than or equal to the number n.

* * * * *